Sept. 26, 1950      I. FREEMAN      2,523,424
ADAPTOR FOR HONEY FRAMES
Filed Feb. 26, 1946      4 Sheets—Sheet 1
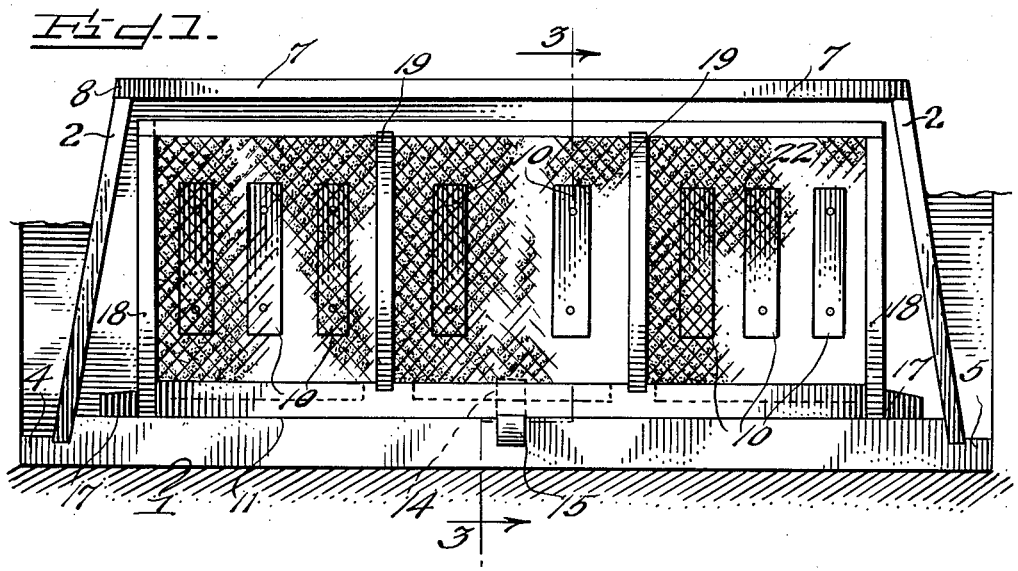
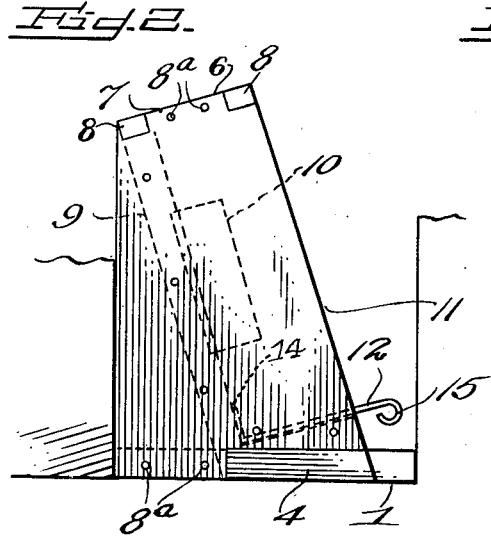 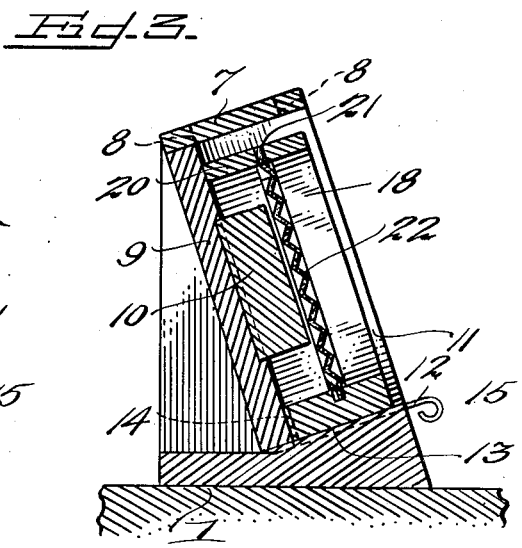
Inventor
IDA FREEMAN.

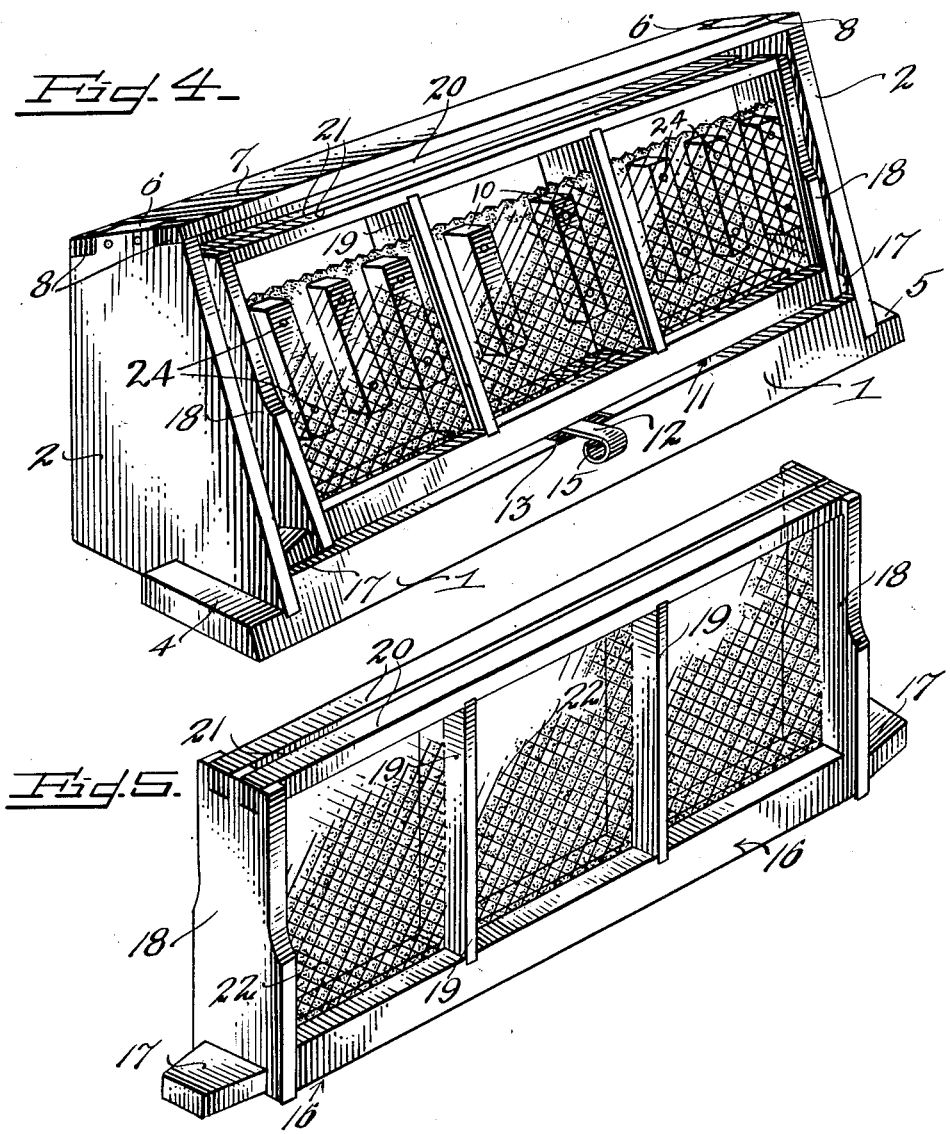

Sept. 26, 1950          I. FREEMAN          2,523,424
ADAPTOR FOR HONEY FRAMES
Filed Feb. 26, 1946          4 Sheets-Sheet 3
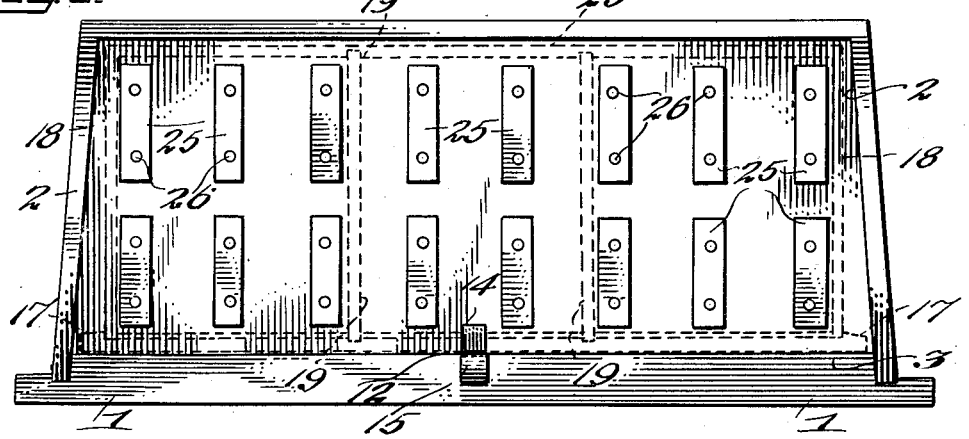
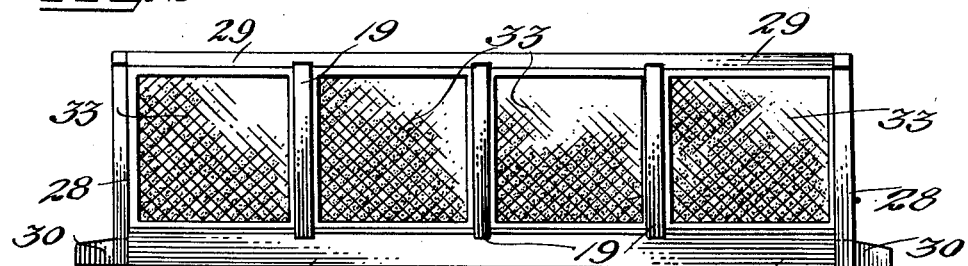
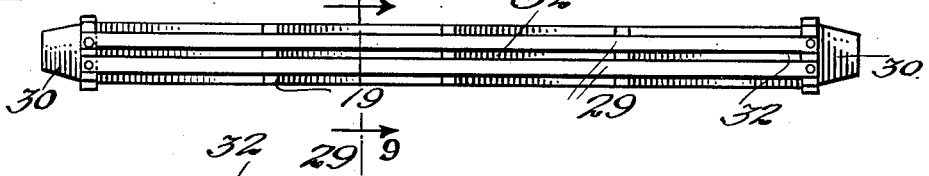
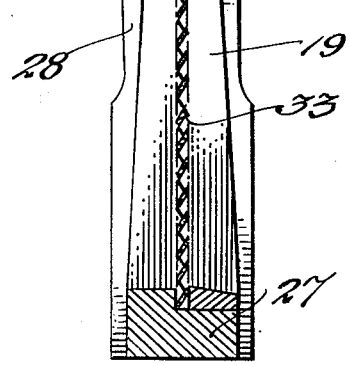
Inventor
IDA FREEMAN.
By Clarence A. O'Brien
and Harvey B. Jacobson
Attorneys

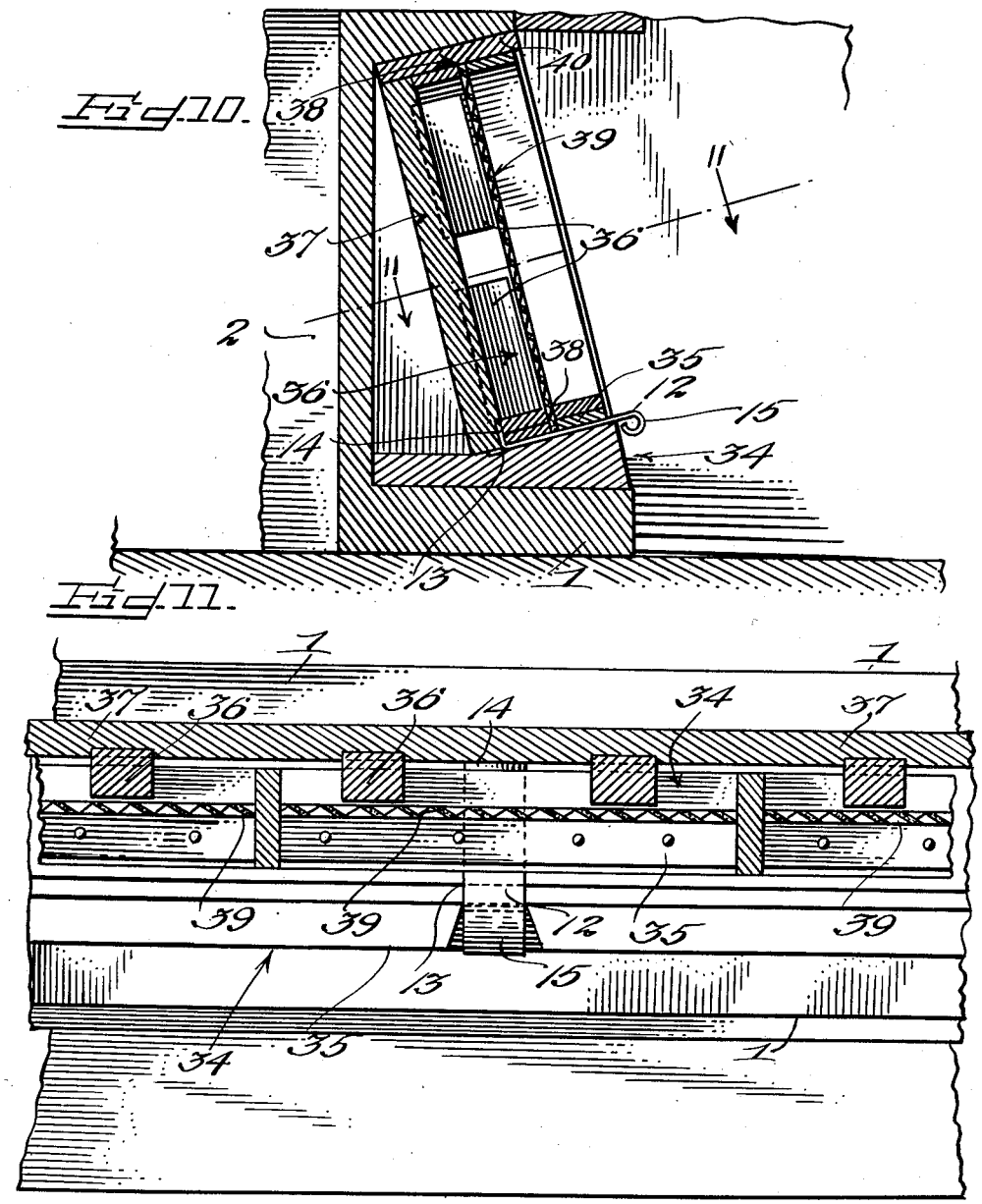

Patented Sept. 26, 1950

2,523,424

UNITED STATES PATENT OFFICE 2,523,424

ADAPTER FOR HONEY FRAMES

Ida Freeman, Altoona, Ala.

Application February 26, 1946, Serial No. 650,204

5 Claims. (Cl. 6—12)

This invention relates to improvements in adaptors for honey frames.

An object of the invention is to provide an improved adaptor for honey frames for supporting the same in the proper position while inserting the sheets of comb foundation within the honey frames and securing the sheets therein.

Another object of the invention is to provide an improved adaptor for honey frames for supporting the frames while facing sheets of comb foundation in the frames, and the provision of means for withdrawing the honey frames from the adaptor after the sheets of comb foundation have been placed in position.

A further object of the invention is to provide an improved adaptor for supporting honey frames while sheets of comb foundation are being inserted in the frames, said adaptor being highly efficient in use and relatively inexpensive to manufacture and produce.

Other objects will appear as the description proceeds.

In the accompanying drawings which form a part of this application,

Figure 1 is a front elevation of the improved adaptor with honey frame positioned therein;

Figure 2 is an end view of the adaptor;

Figure 3 is a sectional view taken on the line 3—3 of Figure 1;

Figure 4 is a perspective view of the adaptor with honey frame positioned therein;

Figure 5 is a perspective view of a shallow-type honey frame showing the slotted upper wall for the insertion of the wax comb foundation or sheets;

Figure 6 is a front elevational view of the adaptor with the honey frames removed and showing the double series of backing blocks;

Figure 7 is a front elevational view of a four section honey frame;

Figure 8 is a top view of the four section honey frame illustrated in Figure 7;

Figure 9 is an enlarged sectional view taken substantially on the line 9—9 of Figure 8;

Figure 10 is a transverse sectional view taken through a deep type adaptor showing the honey frame in wedged position therein, and;

Figure 11 is an enlarged fragmentary transverse sectional view taken on the line 11—11 of Figure 10.

In carrying out the invention, there is provided a beehive of usual construction, a part of which is shown in Figures 1, 3, 10 and 11. The adaptor comprises a housing having a bottom member or base 1 and end walls 2. The forward portion of the base 1 is formed with lateral end extensions 4 and 5, the upper portions of said ends being oppositely notched to form tongues 6. A top plate or member 7 is formed at its ends with the spaced ears 8 between which the tongues 6 are disposed and held in fixed position by means of the nails 8a. The adaptor is further provided with a rearwardly sloping back 9 which supports the plurality of spaced centering blocks 10. The top 7 of the housing is angled or sloped backwardly, and the front portion 11 of the base is also sloped backwardly forming a wedge member and said portion 11 extends parallel to the top member 7 and at right angles to the sloping back 9.

A honey frame releasing flat member 12 is slidably disposed within a groove 13 in the front portion of the base 1 and is formed with an upturned shoulder 14 at its rear extremity, and a handle portion or finger grip 15 on its forward end, so that when a honey frame is in position within the adaptor and it is desired to remove the same, it is only necessary to grasp the handle portion 15 and pull outwardly thereby engaging the rear upturned shoulder 14 with the honey frame to free the same from the housing.

A honey frame 16 is shown in perspective in Figure 5 of the drawings, and comprises a base formed with the oppositely extending ears 17 by which the frame may be grasped when moving it or reversing its position in the adaptor. The frame 16 has ends 18 and spaced partitions 19, also a top formed of the spaced members 20 providing a slot 21 through which the wax foundation or sheet 22 may be inserted to form the basis for the honey comb. The wax sheets 22 are positioned midway of the frame, so that when the frames are placed in the hives in their correct position, there will be ample room for the bees to build full length honey cells in each wax sheet. The blocks 10 are secured by nails 24 in spaced relation to the forward surface of the back 9, and hold comb sheets in position when said sheets are being fastened in the honey frame.

The angular top and bottom of the adaptor is so made that the honey frame when placed therein will lean in a backward position which is convenient in inserting and fastening comb sheets in the frame.

A modification of the adaptor is shown in Figure 6 and employs two rows of spaced backing blocks 25 held to the back by means of nails 26. In Figures 7, 8 and 9 there has been shown a honey frame having a base 27, ends 28 and a top 29, with extensions 30 for supporting and moving the frame.

The top 29 is slotted as at 32 to provide means through which the comb base 33 may be inserted, as shown in Figure 9. The honey comb may be wrapped in waxed paper or placed in comb boxes for shipment as desired.

In Figures 10 and 11 there is shown a deep type adaptor generally denoted by the reference character 34, which is also formed with the angled or sloping top and a wedge shaped bottom member to wedge the honey frame 35 in fixed position by engagement with the shim 40, which is disposed at the open top of this particular honey frame 34. Backing or centering blocks 36 are secured in place on the back wall 37, and a longitudinal slot 38 is formed in the top of the honey frame 34, through which the comb base or wax sheets 39 may be inserted.

Having thus described my invention what I claim as new and desire to secure by Letters Patent of the United States is:

1. A support for honey cultivation frames comprising a housing including substantially parallel top and bottom members, sides attached to said top and bottom, a back secured to said sides and said top and bottom, said bottom having a recess, and means in said recess for withdrawing a frame from said housing, said means comprising a flat member having an extension at one end thereof adapted to engage the back portion of the frame, and a finger grip at the opposite end of said flat member exterior of said housing.

2. A support for honey cultivation frames comprising a housing including substantially parallel top and bottom members, sides attached to said top and bottom, a back secured to said sides and said top and bottom, a honeycomb frame supporting wedge-shaped member in said housing and disposed on said bottom member, said supporting member having a recess, and means in said recess for withdrawing honeycomb frame from said housing.

3. A support for honey cultivation frames comprising a housing including substantially parallel top and bottom members, sides attached to said top and bottom, a back secured to said sides and said top and bottom forming a container for a honeycomb frame, said supporting member having a recess, means in said recess for withdrawing the frame from said housing, and centering blocks for the frame attached to said back.

4. The combination of claim 3 and said frame withdrawing means comprising a bracket having an upturned end and slidably received in said recess.

5. A support for honey cultivation frames comprising a housing, said housing including a top wall and a bottom wall, the inside surface of said top wall being disposed at an incline with respect to the horizontal, an adapter member removably disposed on said bottom wall and having an upper surface parallel to said inclined surface to support a honeycomb frame, said adapter member being adapted to seat a honeycomb frame and having a recess therein, means slidably disposed in said recess to withdraw the honeycomb frame from the inclined surface of said adapter member.

IDA FREEMAN.

REFERENCES CITED

The following references are of record in the file of this patent:

UNITED STATES PATENTS

| Number | Name | Date |
|---|---|---|
| 999,544 | Boyum | Aug. 1, 1911 |
| 1,638,064 | Shook | Aug. 9, 1927 |